United States Patent [19]
Ohta

[11] Patent Number: 5,434,637
[45] Date of Patent: Jul. 18, 1995

[54] CONTROL APPARATUS

[75] Inventor: Seiya Ohta, Yokohama, Japan

[73] Assignee: Canon Kabushiki Kaisha, Tokyo, Japan

[21] Appl. No.: 57,984

[22] Filed: May 4, 1993

[30] Foreign Application Priority Data

May 7, 1992 [JP] Japan .................. 4-141133

[51] Int. Cl.⁶ .............................. G03B 17/00
[52] U.S. Cl. ............................... 354/286
[58] Field of Search ........... 354/286, 400, 402, 195.1, 354/195.12

[56] References Cited

U.S. PATENT DOCUMENTS

| | | | |
|---|---|---|---|
| Re. 33,015 | 8/1989 | Nakai et al. | 354/286 |
| 4,881,094 | 11/1989 | Terui et al. | 354/286 |
| 4,952,962 | 8/1990 | Suzuki et al. | 354/286 X |
| 5,053,798 | 10/1991 | Ohra et al. | 354/400 |
| 5,172,154 | 12/1992 | Katagishi et al. | 354/286 X |
| 5,214,464 | 5/1993 | Karasaki et al. | 354/286 |
| 5,255,043 | 10/1993 | Kawasaki | 354/286 X |
| 5,257,058 | 10/1993 | Mabuchi | 354/286 |

*Primary Examiner*—David M. Gray
*Attorney, Agent, or Firm*—Morgan & Finnegan

[57] ABSTRACT

A control apparatus in a system which has a control apparatus such as a camera or the like and an apparatus to be controlled such as a lens unit or the like which can be attached or detached to/from the control apparatus and in which the control apparatus controls the apparatus to be controlled on the basis of peculiar data of the apparatus to be controlled comprises: a rewritable memory to store the peculiar data; an updating circuit for comparing the peculiar data read out from the apparatus to be controlled and the storage data stored in the memory and for updating the data; and a data discriminating circuit for discriminating whether the peculiar data read out from the apparatus to be controlled is normal or abnormal and for inhibiting the storage and updating of the data to the memory when it is determined that the peculiar data is abnormal.

19 Claims, 11 Drawing Sheets

CONTROL APPARATUS

BACKGROUND OF THE INVENTION

1. Field of the Invention.

The present invention relates to a system to control various kinds of functions of an apparatus to be controlled by electrically exchanging information between the apparatus to be controlled such as a lens unit or the like and a control apparatus such as a camera unit or the like.

2. Related Background Art

In recent years, an exchangeable lens system has also been adopted in a field of, for example, a video camera or the like and the function is remarkably being enhanced. FIG. 1 is a schematic diagram showing an automatic focusing control (hereinafter, referred to as an AF) in, for example, a video camera system of the exchangeable lens system.

In the diagram, reference numeral 1 denotes a camera side and 2 indicates a lens side. The camera side 1 and the lens side 2 are mechanically, optically, and electrically connected by a mount 3 having electrical connection.

A light passes through a focusing lens unit 21, a zooming lens unit 22, and a diaphragm mechanism 23 on the lens 2 side and is converted into a video signal by an image pickup device 11 such as a CCD or the like on the camera 1 side. The video signal is subsequently converted into the composite video signal by an amplifier 12, a signal processing circuit 13, and the like. The composite video signal is supplied to a recording section such as a video tape recorder or the like.

On the other hand, a high frequency component in the video signal which changes in accordance with a focusing state is extracted from the output signal of the signal processing circuit by a filter circuit 14 and is supplied to a camera microcomputer 15 to perform the AF control.

The camera microcomputer 15 calculates a direction signal and a speed signal to drive a focusing lens group on the basis of the level of the high frequency component of the video signal and the present state of the lens such as a depth of field or the like which is obtained by the focusing lens position information (which is detected by a focusing encoder 24 and is obtained through a lens microcomputer 27) in the lens unit 1 and, further, the position information (which is detected by zooming encoder 25 and is obtained through the lens microcomputer 27) and the diaphragm information (which is detected by an iris encoder 26 and is obtained through the lens microcomputer 27) of the zooming lens group. The direction signal and speed signal are transmitted to the lens microcomputer 27 on the lens side through a serial communication line SL.

On the basis of a command from the camera microcomputer 15, the lens microcomputer 27 drives a focusing motor 29 via a motor driver 28, thereby moving the focusing lens unit 21. Information regarding the movement amount in this instance is sent to the camera microcomputer 15 through the lens microcomputer 27 by the focusing encoder 24. The AF control is executed by continuously executing the above series of operations.

The control speed in this instance can be unconditionally determined since the same motor is always controlled in the case where the lens unit and the camera unit are integratedly constructed.

In case of the exchangeable lens system, however, since the lens unit which is connected is changed, the speed of the focusing motor is also changed in accordance with the lens unit attached. Therefore, it is desirable that the focusing speed information which is given from the camera microcomputer 15 to the lens microcomputer 27 has been normalized to a certain form. It is considered that, for example, a change speed of blur circle diameter at the image pickup surface of the image pickup device 11 is used as such normalization information. That is, by controlling so as to set the change speed of the blur circle diameter at the image pickup surface to a predetermined speed even when any lens unit is attached, the AF control can be executed without being influenced by a difference of the characteristics of the lens unit.

Reference numerals 30 and 31 denote a zooming motor and a zooming driver to drive the zooming lens unit 22. The zooming motor and zooming driver are controlled by commands which are generated from the lens microcomputer 27 on the basis of control information from the camera side.

Reference numerals 32 and 33 denote an IG meter and a diaphragm driver to drive the diaphragm mechanism 23. The IG meter and diaphragm driver are controlled by commands which are generated from the lens microcomputer 27 on the basis of control information from the camera side.

On the other hand, FIG. 2 is a schematic diagram showing the AF control in, for example, a silver-salt still camera system of the exchangeable lens system.

In the diagram, reference numeral 4 denotes a camera side; 5 a lens side; and 6 an electrical connection mount. The light passes through a focusing lens unit 51, a zooming lens unit 52, and a diaphragm mechanism 53 on the lens 5 side and is transmitted through a shutter mechanism 41 on the camera 4 side and is formed as an image on a film photo sensitive surface 42.

A sensor unit for AF control (hereinafter, referred to as an AF sensor) 43 is arranged. An output of the AF sensor 43 is supplied through an amplifier 44 to a camera microcomputer 45 to perform the AF control.

The camera microcomputer 45 calculates the movement distance of the focusing lens from the present position of the focusing lens group to the in-focus point on the basis of an output signal of the AF sensor 43 and the present state of the lens due to the position information (which is detected by a zooming encoder 54 and is obtained through a lens microcomputer 59) of the zoom lens group of the lens unit 5, the diaphragm information (an opening F-No that is inherent to the lens unit and is obtained through the lens microcomputer 59), and the like. The camera microcomputer 45 subsequently supplies a direction signal and a signal indicative of the number of drive pulses to drive a pulse motor on the lens side to the lens microcomputer 59 through the serial communication line.

The lens microcomputer 59 drives a focusing motor 55 via a motor driver 56 on the basis of a command from the camera microcomputer 45, thereby moving the focusing lens unit 51 to the in-focus point. The AF control is executed by the above series of operations.

The number of pulses to control in this instance can be unconditionally determined because the same motor is always controlled in the case where the lens unit and the camera unit are integratedly constructed.

In case of the exchangeable lens system, however, since the lens which is connected is changed, a focusing change amount per pulse is also obviously changed in accordance with the lens unit attached.

Therefore, it is desirable to construct the camera side in a manner such as to receive information such as lens feed amount per one pulse of the focusing motor, lens sensitivity at the focal distance, and the like from the lens side and to thereby determine the number of drive pulses on the basis of such information.

In the still camera or video movie camera as mentioned above, different from the ordinary camera/lens integrated type system, a plurality of lenses whcih are used for vairous kinds of functions and applications are exchanged and used in accordance with the photographing state, so that a photographing range can be widened, so that an exchangeable lens system is proposed. In such a system the automatic focusing control (AF) and the automatic exposure control (AE) are generally used.

In case of executing such a control as mentioned above, for example, with respect to the AF control the speed control is performed on the basis of the information such as sensitivity, opening F-No, focal distance, and the like of the lens. The information necessary for control on the camera side as mentioned above has ordinarily been stored in an ROM on the lens side. By requesting such data from the camera side to the lens side in accordance with a necessary format and by controlling on the camera side on the basis of the information derived from the lens side, no special problem occurs.

In the case where, for example, the lens for use in the silver-salt still camera which has already existed is also used as an exchangeable lens for use in the video movie camera, however, since a photographing object, a control target, and design idea of the still camera lens are inherently different from those of the exchangeable lens, the data that is needed for processing by the camera side in the exchangeable lens system of the video movie cannot always be obtained from the lens for the still camera in a form as it is. Therefore, it is necessary to convert the data which is obtained from the lens for the still camera into the data of a form that is needed by the processes such as arithmetic operations or the like.

In this instance, however, there is a case where such data is given as a function of the focal distance (data is changed in dependence on the focal distance at the time—the position of a zoom ring). Generally, in case of the still camera, the change in zoom is frequently accomplished by manually rotating the zoom ring by the user by himself. In such a case, the zoom ring cannot be rotated from the camera side.

Therefore, there is considered to use a method whereby in order to enable good AF control and AE control to be executed from the beginning, peculiar data that is necessary for the AF control and AE control of various lenses are previously stored into a memory device and means for recognizing the type of lens attached in the case where the lens was attached and means for reading out the data of the lens recognized from the memory device are provided.

In the above conventional apparatuses, however, when the data to be stored has some inconveniences, for example, when the data abnormally changes due to an erroneous fetching of the data in the attaching/detaching operations of the lens or the like, so long as the maximum or minimum value of the changed data is needed to control, the data is stored into the memory device at a time point when the abnormally changed data becomes the maximum or minimum value. Not only the normal control is not executed but also such a situation becomes a cause of the abnormal operation, so that it is extremely unpreferable.

SUMMARY OF THE INVENTION

It is an object of the invention to solve the above problems as mentioned above.

Another object of the invention is to realize a control system such that an apparatus to be controlled such as an exchangeable lens group or the like is used in a system such as an exchangeable lens system and even when any lens is attached, good AF control and AE control can be executed from the beginning.

To solve the above problems, according to an embodiment of the present invention, there is provided a control apparatus in a system which comprises a control apparatus and an apparatus to be controlled which can be freely attached or detached to/from the control apparatus and in which the control apparatus controls the apparatus to be controlled on the basis of data that is peculiar to the apparatus to be controlled, wherein the control apparatus comprises: rewritable memory means for storing the peculiar data; means for comparing the peculiar data read out from the apparatus to be controlled and the data stored in the memory means and for updating the data; and data discriminating means for discriminating whether the peculiar data read out from the apparatus to be controlled is normal or abnormal and for prohibiting the storage and updating of the data into the memory means when it is determined that the peculiar data has a abnormal value.

According to another embodiment of the invention, there is provided a conversion adapter which has signal converting means for matching between a control apparatus and an apparatus to be controlled whose control methods are different and in which the control apparatus can control the apparatus to be controlled on the basis of data that is peculiar to the apparatus to be controlled, wherein the conversion adapter comprises: rewritable memory means for storing the peculiar data; means for comparing the peculiar data read out from the apparatus to be controlled and the data stored in the memory means and for updating the data; and data discriminating means for discriminating whether the peculiar data read out from the apparatus to be controlled is normal or abnormal and for prohibiting the storage and updating of the data into/from the memory means when it is determined that the peculiar data has an abnormal value.

According to still another embodiment of the invention, there is proivded an exchangeable lens system which can freely attach/detach a lens unit to/from a camera main body, wherein the exchangeable lens system comprises: data converting means for converting focusing control information generated from the camera main body side into information which can drive a focusing lens in the lens unit; and selecting means for selecting the minimum number of drive pulses of the focusing lens on the basis of peculiar data derived by the lens unit.

According to further another embodiment of the invention, there is provided a conversion adapter which connects a lens unit to a camera main body, wherein the conversion adapter comprises: data converting means for converting focusing control information generated from the camera main body side into information which can drive a focusing lens in the lens unit; and selecting means for selecting the minimum number of drive pulses of the focusing lens on the basis of peculiar data derived from the lens unit.

By using the above means, necessary data is read out from the memory device and the apparatus is controlled on the basis of the read-out data without storing the values of the wrong data into the memory device, the good AF control and AE control can be executed in the control system such as an exchangeable lens system or the like.

On the other hand, the AF control information is corrected on the basis of the peculiar data of the lens unit and the good AF control can be executed irrespective of the lens unit.

The above and other objects and features of the present invention will become apparent from the following detailed description and the appended claims with reference to the accompanying drawings.

DETAILED DESCRIPTION OF THE PREFERRED EMBODIMENTS (First Embodiment)

Figure 1:
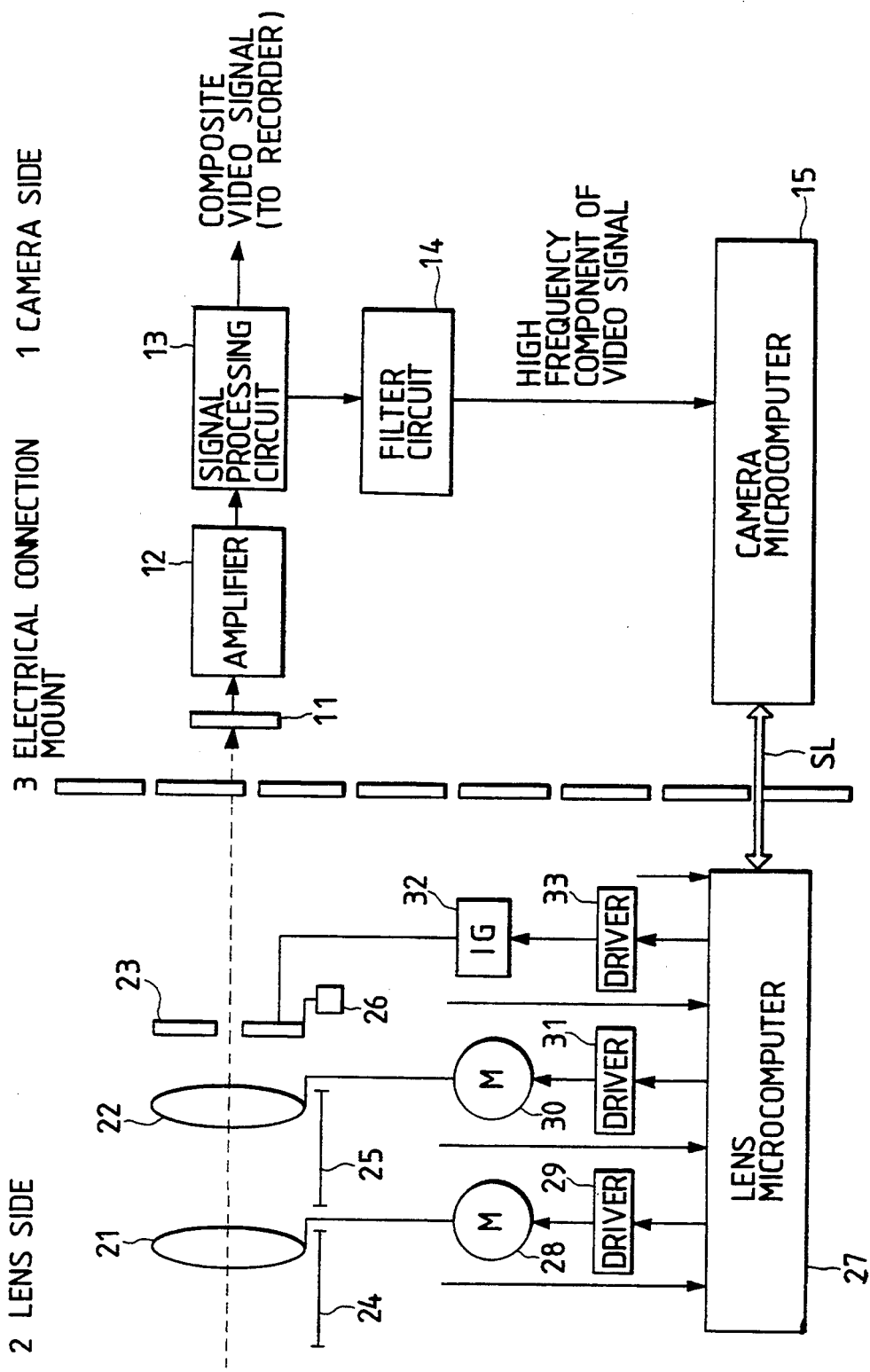
FIG. 1 is a block diagram showing an example of a video camera system of the exchangeable lens types.
Figure 2:
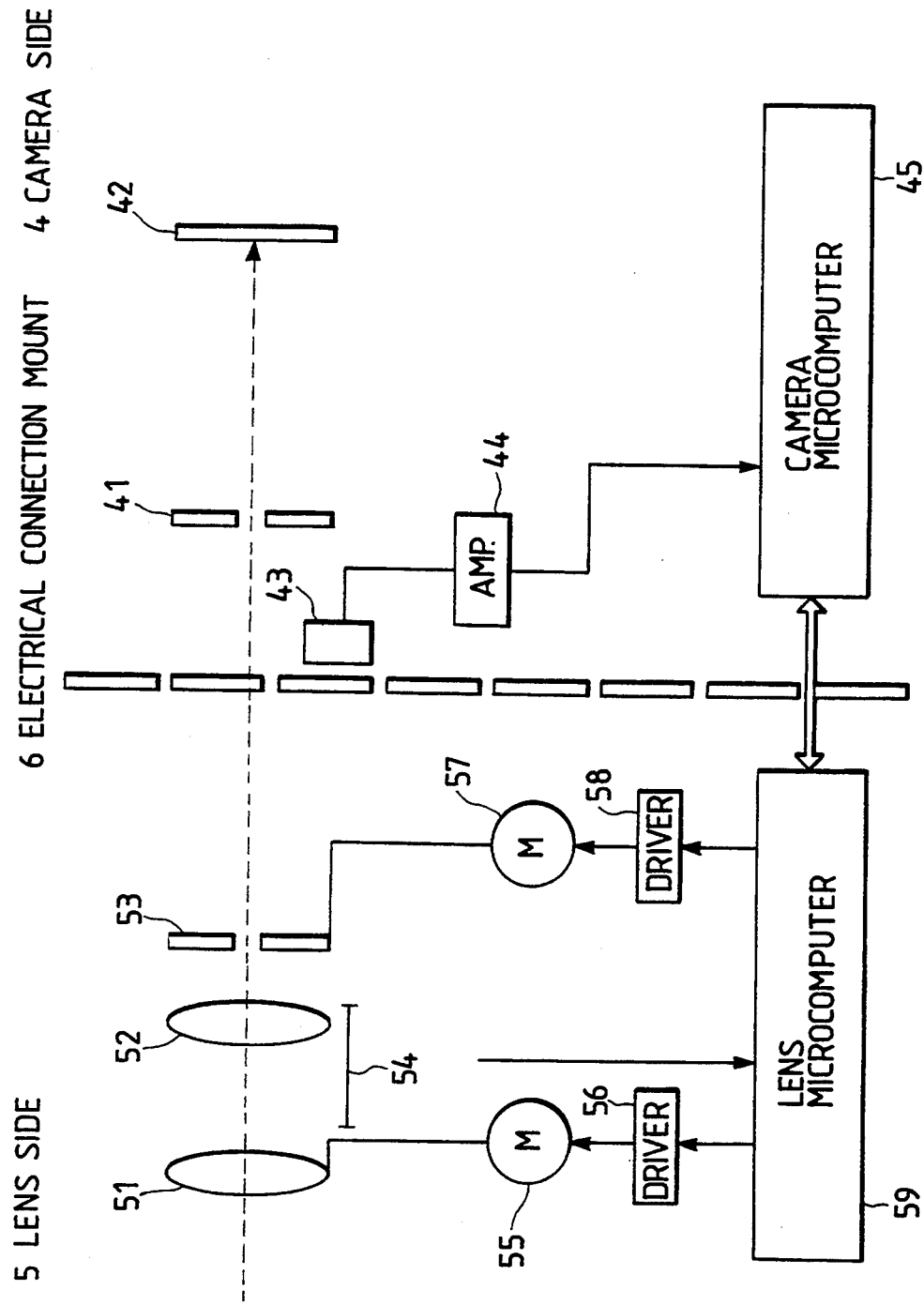
FIG. 2 is a block diagram showing an example of a still camera system of the exchangeable lens type.
Figure 3:
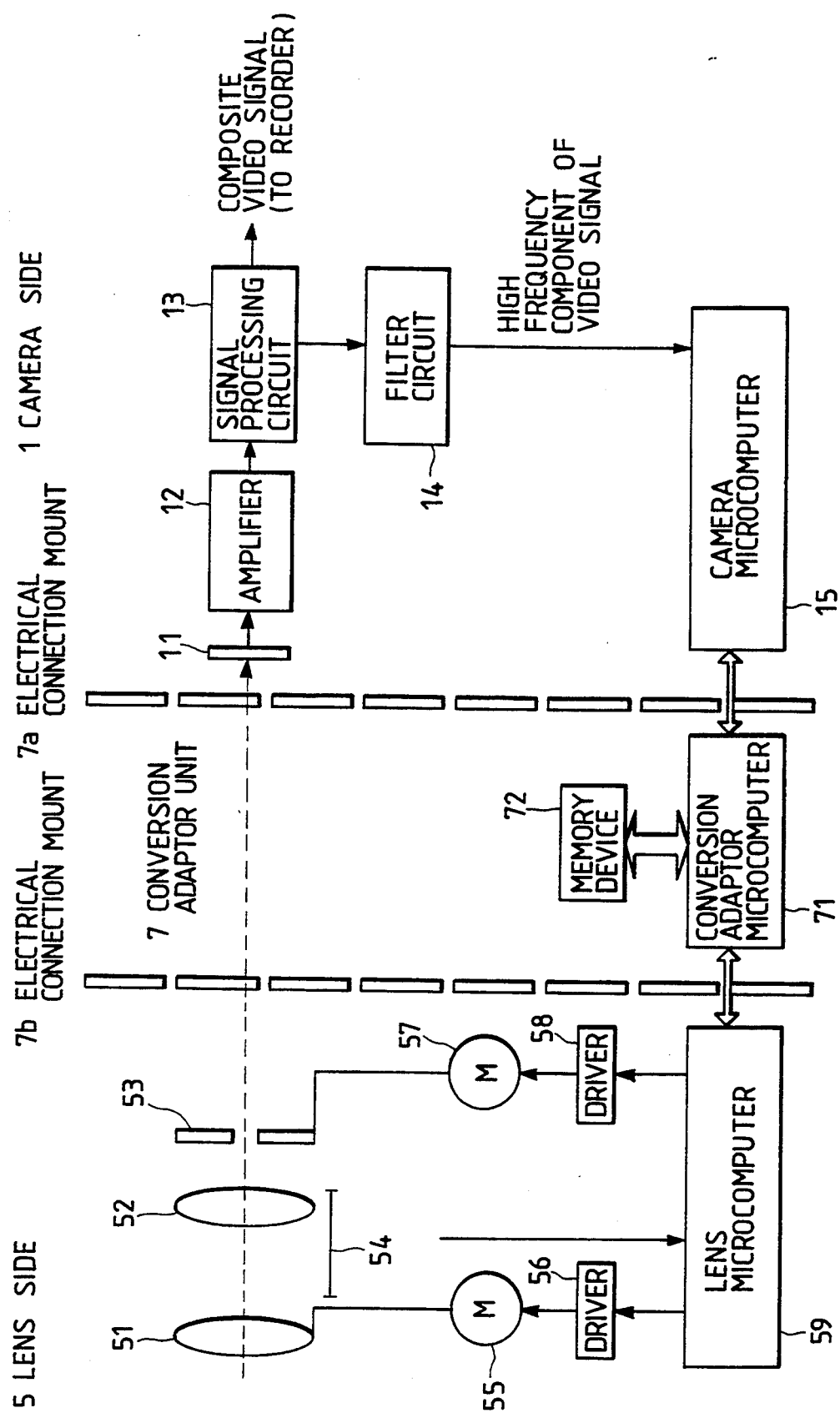
FIG. 3 is a block diagram of an exchangeable lens system using a conversion adapter showing the first embodiment.

FIG. 3 is a diagram showing a construction of the first embodiment of the present invention and the same component elements as those in the conventional apparatus shown in FIGS. 1 and 2 mentioned above are designated by the same reference numerals and their detailed descriptions are omitted here.

FIG. 3 is a schematic diagram showing the AF control in an exchangeable lens system in which a camera section of an exchangeable lens system for a video movie camera and a lens section of an exchangeable lens system for a still camera are connected by a mount conversion adapter.

In FIG. 3, reference numeral 1 denotes the camera unit section of an exchangeable lens system of a video movie camera; 2 the lens section of an exchangeable lens system of a still camera; 7 a conversion adapter section which is used to mechanically, optically, and electrically connecting both of the camera unit section 1 and the lens section 2 and to match communication formats and the like of them. Reference numerals 7a and 7b indicate mounts which are respectively connected to the camera side and the lens side; 71 a conversion adapter microcomputer to convert and match various kinds of control information between the lens unit and the camera unit in the conversion adapter; and 72 a memory device to update the stored contents of the data which is necessary for various kinds of controls on the basis of commands which are generated from the conversion adapter microcomputer 71.

Figure 4:
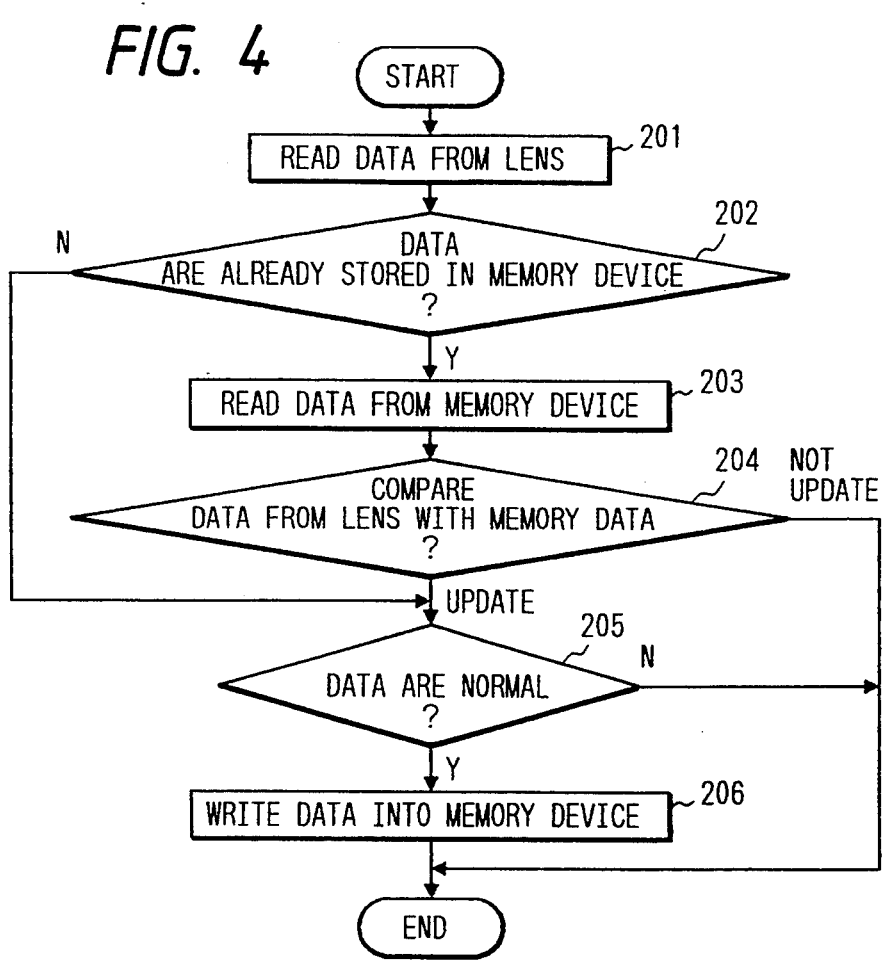
FIG. 4 is a flowchart for explaining the operation of the invention.

FIG. 4 is a flowchart for storing and updating processes of data to the memory device in the conversion adapter microcomputer 71 in FIG. 3. The memory device 72 can be built in the microcomputer or can be also connected to the outside of the microcomputer.

In step 201, the necessary data is read out from the lens microcomputer 59 on the lens unit side. In step 202, a check is made to see if the data of the lens attached has already been stored in the memory device 72 or not by discriminating the identification number or the like which is peculiar to the lens unit. When the lens data is not yet stored in the memory device, the processing routine advances to step 205. A check is made to see if the data read out from the lens unit in step 201 is normal or abnormal.

When the lens data has already been stored in the memory device in step 202, the stored data is read out from the memory data 72 in step 203. In step 204, the stored data is compared with the data read out from the lens. When the value of the read data exceeds the maximum or minimum value stored and updates the stored value as a result of the comparison, a check is made in step 205 to see if the data as a target to be stored is normal or abnormal. When the value of the read data is not equal to the maximum or mininum value, the updatig process of the data to the memory device is not executed but the control is finished.

In step 205, only when the data is determined to be normal, the data is written into the memory device, when the data is decided to be abnormal, the data is not written into the memory device.

According to the embodiment as mentioned above, by judging the data, the abnormal data is not stored. The embodiment intends to eliminate the following problem. Namely, in the case where the data has an abnormal value due to some inconvenience such as erroneous fetching of the data in, for example, the attaching/detaching operation of the lens or the like and such abnormal value updates the maximum or minimum value, such data is stored into the memory device. Thus, not only the AF control of AE control is not normally executed but also the focusing lens vigorously operates or doesn't operate or the diaphragm is not operated.

Figure 5:
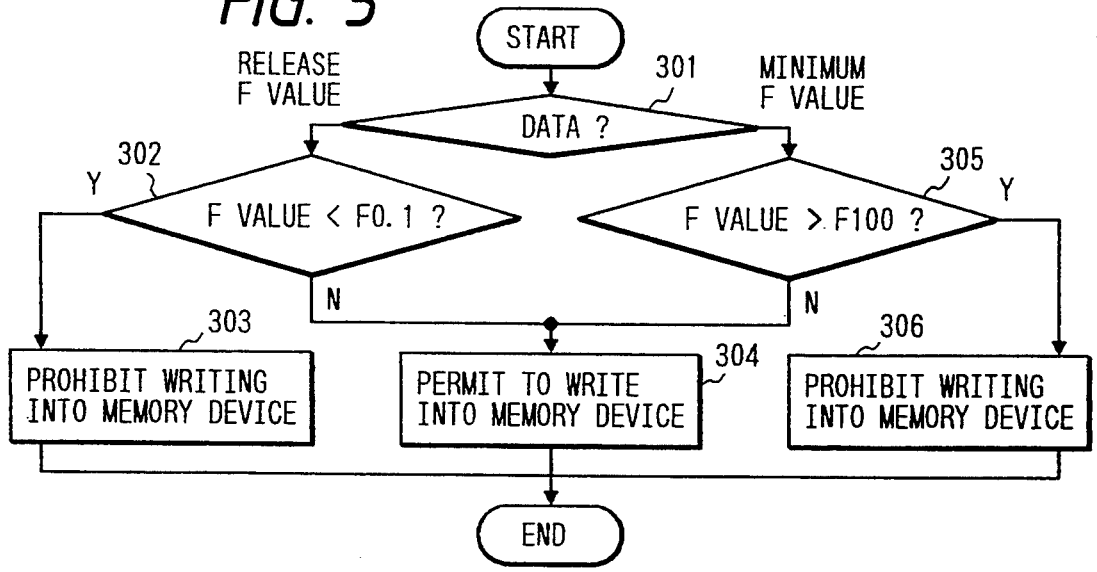
FIG. 5 is a flowchart for explaining the operation of the invention.

FIG. 5 is a flowchart specifically showing the process in step 205 in FIG. 4 to see if the data is normal or abnormal. Explanation will now be made on the assumption that, for example, the data as a target to be stored is an release F value and the minimum F value of the data that is peculiar to the lens. In this instance, it is assumed that the minimum value is stored into the memory device as an release F value and the maximum value is stored as a minimum F value.

Target data is judged in step 301. When the target data indicates the release F value, step 302 follows. In step 302, for example, when the F vlaue is less than F0.1, the writing operation is prohibited in step 303. If NO in step 302, the writing operation is permitted in step 304. When the target data indicates the minimum F value, step 305 follows. In step 305, when the F value is larger than, for example, F100, the writing operation is prohibited in step 306. If NO in step 305, the writing operation is permitted in step 304.

As mentioned above, in case of the abnormal data such that it is not considered that the function of the AF control or AE control is not operated, another peculiar data of the lens, or the data such that it can be recognized or judged to be abnormal data from some information from the camera or the like, such data is not stored into the memory device.

(Second Embodiemnt)

The second embodiment will now be described hereinbelow. According to the second embodiment, in a movie video camera system of the exchangeable lens type, a data memory device is provided on the camera side and the judgment of the registration or updating when data is stored is executed.

Figure 6:
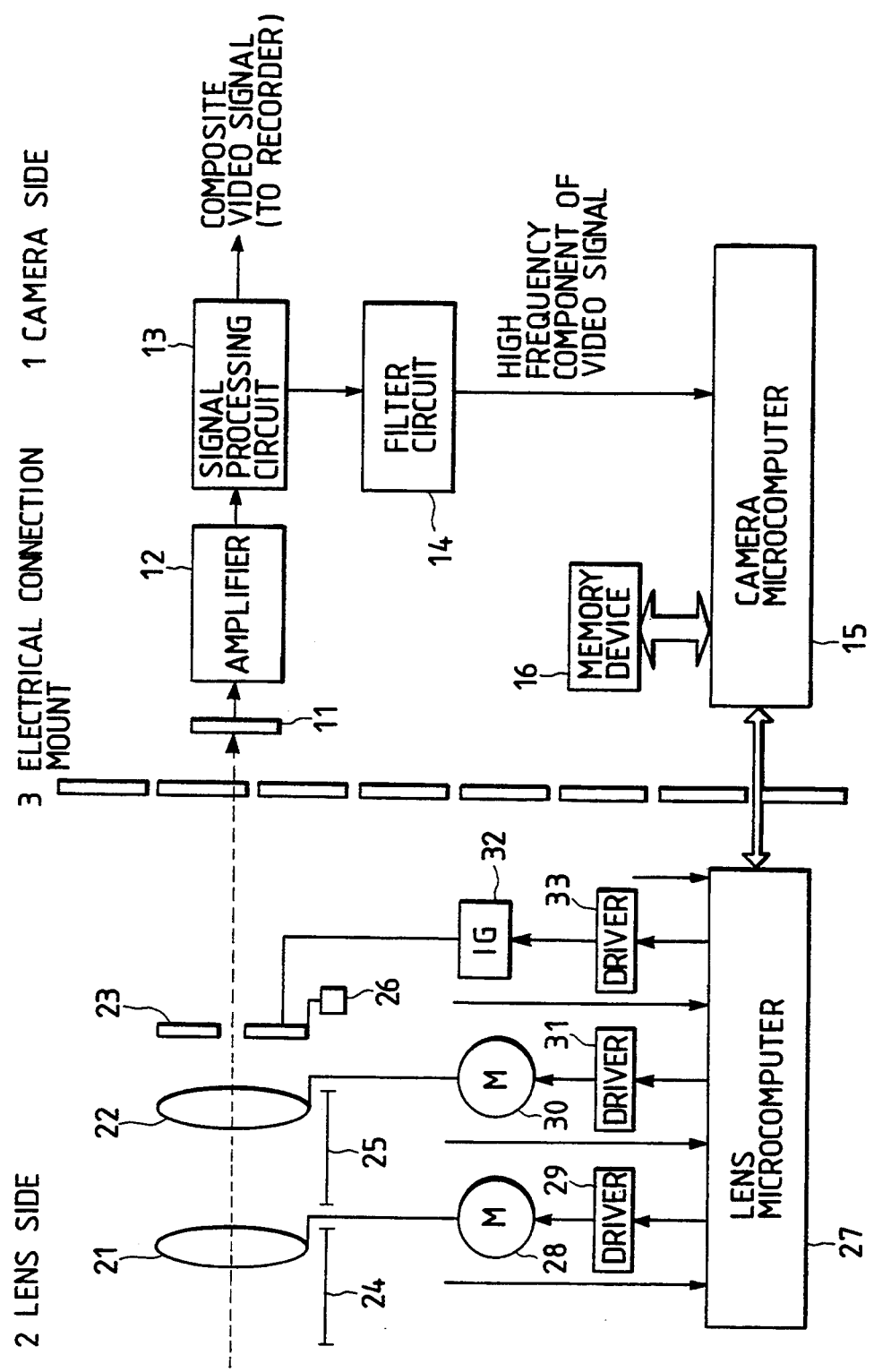
FIG. 6 is a block diagrm of an exchangeable lens system showing the second embodiment of the present invention.

FIG. 6 is a block diagram for explaining the second embodiment of the invention. In FIG. 6, the same component elements as those shown in the above conventional apparatus are designated by the same reference numerals and their detailed descriptions are omitted here. The camera microcomputer 15 controls the storage and updating of data for a rewritable memory device 16. In a mannner similar to the first embodiment, when data is stored into the memory device 16 for the purpose of control, in the case where the data is recognized or determined to be abnormal, the storage and updating of the data are not executed. The memory device 16 can be built in the camera microcomputer 15 or can be also connected to the outside.

(Third Embodiment)

The third embodiment of the invention will now be described. According to the third embodiment, a memory device of data is provided for the camera section in a silver-salt film camera system of the exchangeable lens type, and the registration and updating when the data is stored is executed.

Figure 7:
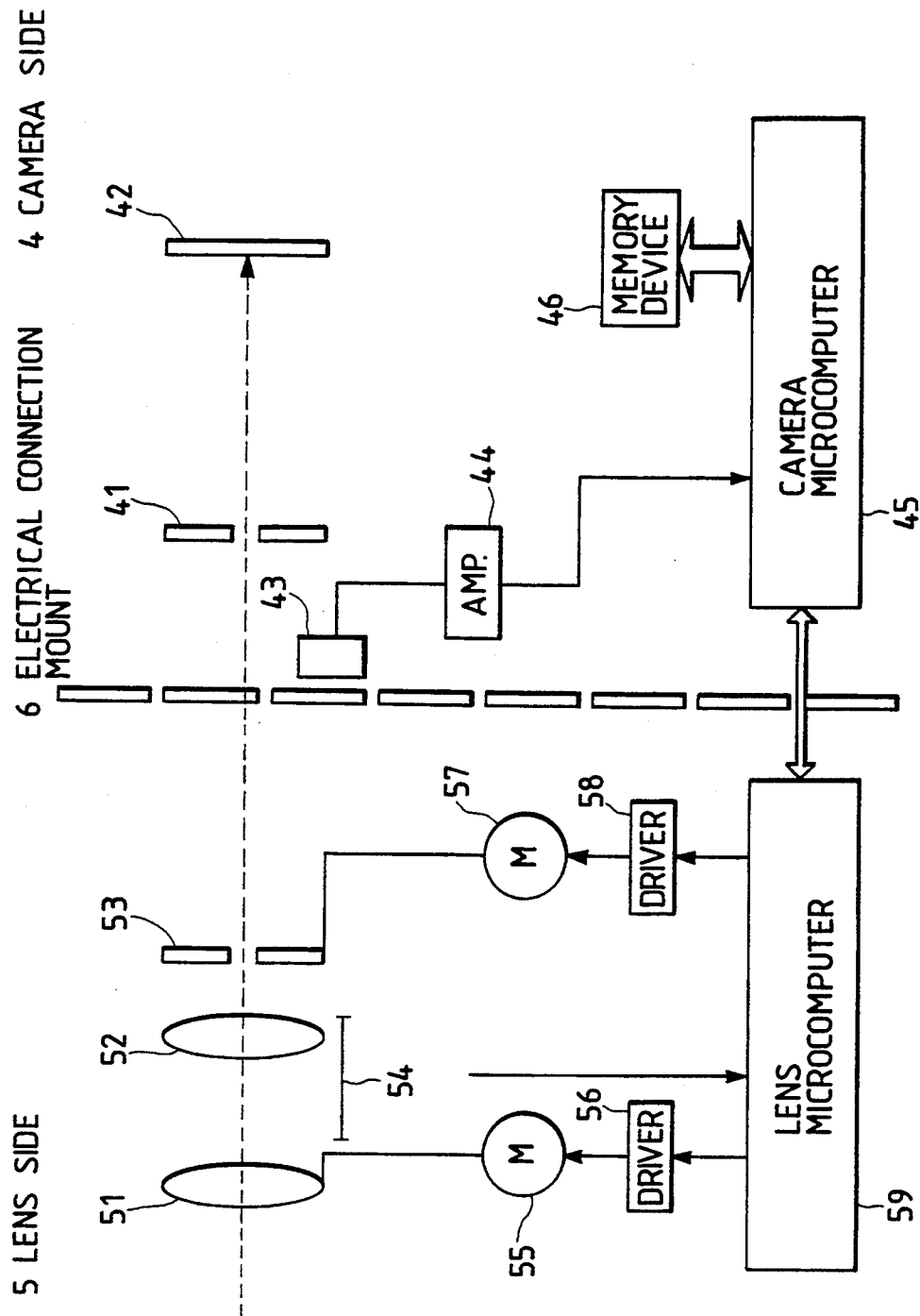
FIG. 7 is a block diagram of an exchangeable lens system showing the third embodiment of the invention.

FIG. 7 is a block diagram for explaining the third embodiment of the invention. In FIG. 7, the same component elements as those shown in the above conventional apparatus are designated by the same reference numerals and their detailed descriptions are omitted here. The camera microcomputer 45 controls the storage and updating of data for the rewritable memory device 46. In a manner similar to the first embodiment, when data is stored into the memory device 46 for the purpose of control, in the case where the data is recognized or determined to be abnormal, the storing and updating operations are not performed. The memory device 46 can be built in the camera microcomputer 45 or can be also connected to the outside.

(Fourth Embodiment)

The fourth embodiment will now be described. According to the fourth embodiment, in an exchangeable lens system in which a camera unit section of an exchangeable lens system for a video movie camera and a lens section of an exchangeable lens system of a silver-salt film camera by a mount exchange adapter, a memory device of data is provided for the camera section and the storage and updating of data are judged on the camera side.

Figure 8:
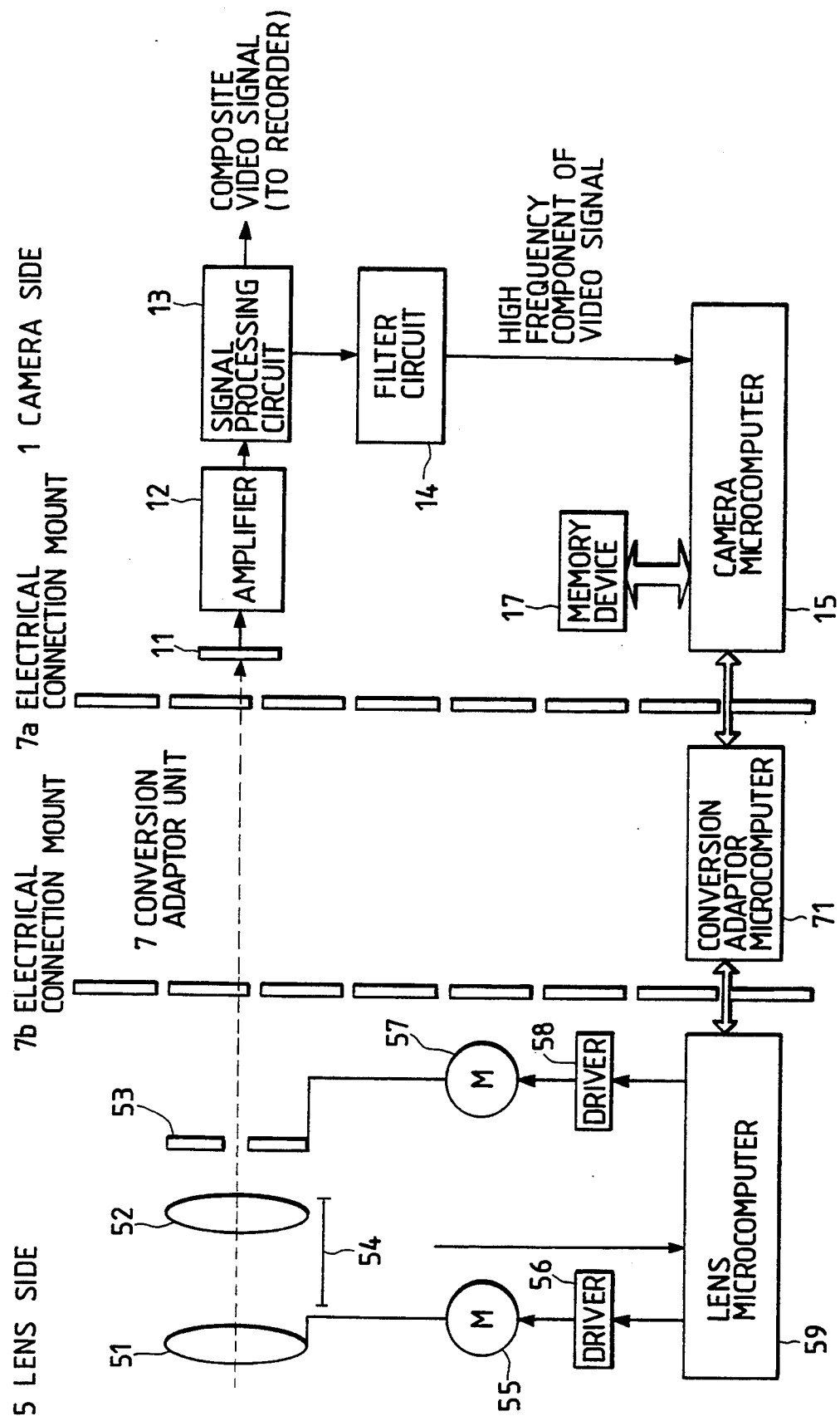
FIG. 8 is a block diagram of an exchangeable lens system using a conversion adapter showing the fourth embodiment of the invention.

FIG. 8 is a block diagram for explaining the fourth embodiment of the invention. In FIG. 8, the same component elements as those shown in the first embodiment mentioned above are designated by the same reference numerals and their detailed descriptions are omitted here. The camera microcomputer 15 controls the storage and updating of data for a rewritable memory device 17. In a manner similar to the foregoing first embodiment, when data is stored into the memory device for the purpose of control, the data such that it can be recognized or determined to be abnormal is not stored into the memory device. The memory device 17 can be built in the microcomputer or can be also connected to the outside of the microcomputer. It is not always necessary to provide the memory device for the conversion adapter.

By using the data discriminating means as shown in the present invention, it is possible to realize a control system of a conversion adapter such that even when any lens is attached, an erroneous operation by abnormality of memory data can be prevented and the good AF control and AE control can be executed from the beginning.

(Fifth Embodiment)

The fifth embodiment of the present invention will now be described. According to the fifth embodiment, in a camera system of the exchangeable lens type, there is provided a conversion adapter such that as in the case where, for instance, a lens unit for a silver-salt film camera is connected to a video camera unit, a lens unit and a camera unit of different AF methods can be connected.

Figure 9:
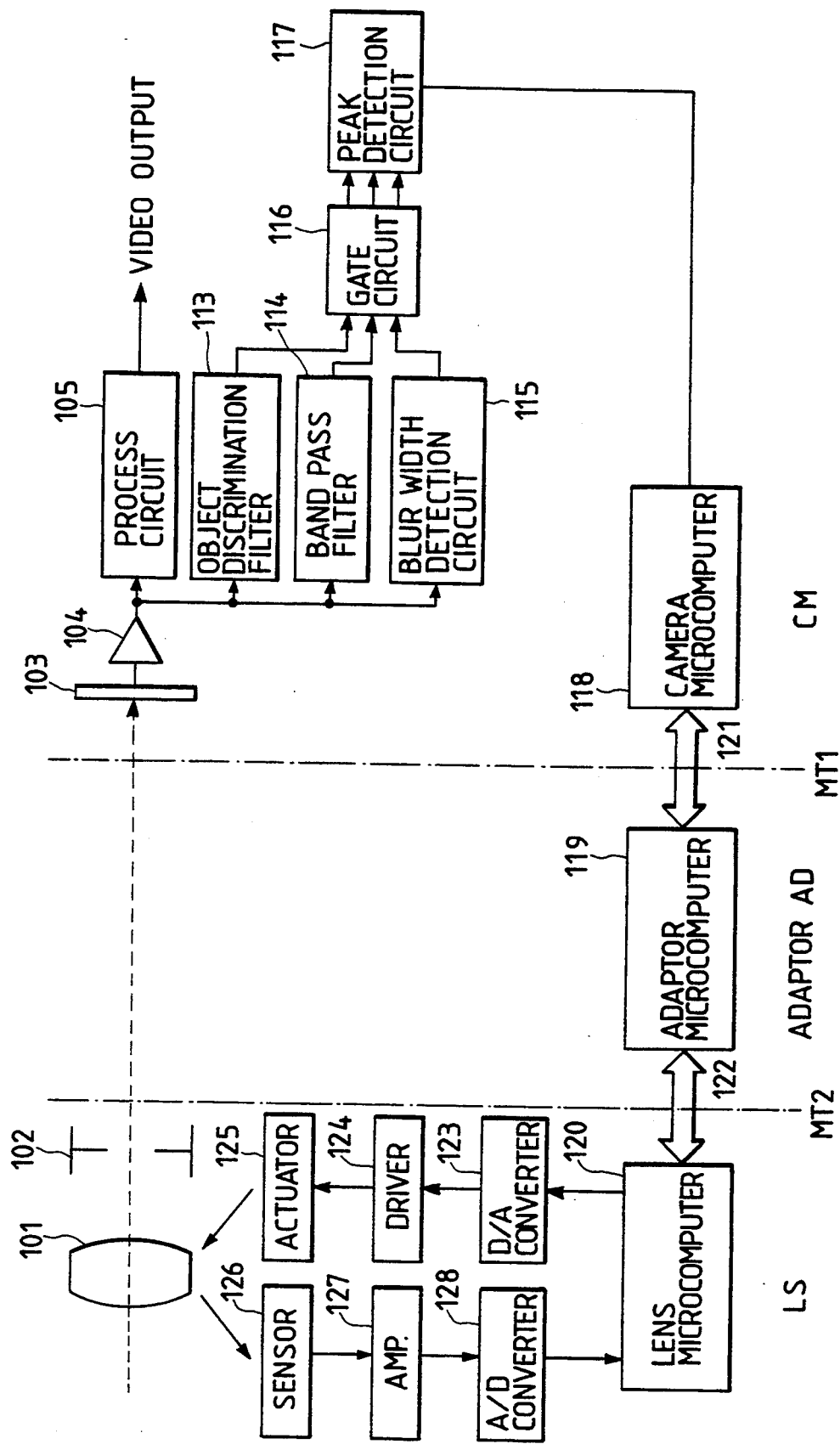
FIG. 9 is a block diagram for explaining the fundamental principle of the control in the exchangeable lens system using the conversion adapter.

The principle of the AF control of the camera system of the exchangeable lens type will be first described with reference to FIG. 9.

In the diagram, mount sections $MT_1$ and $MT_2$ shown by alternate long and short dash lines are set to boundaries, the right side of the boundaries relates to a camera unit CM, the left side relates to a lens unit LS, and the intermediate portion between the camera unit and the lens unit relates to an adapter AD.

The conversion adapter is connected in consideration of the optical path between the camera unit and the lens unit and converts the data which is mutually transmitted between the camera and the lens into the data of a controllable form and corrects the data as necessary and communicates through data communication paths 121 and 122, thereby enabling the camera unit and the lens unit to be mutually controlled.

Reference numeral 101 denotes a photographing lens system having a focusing lens to adjust a focal point (hereinafter, referred to as a focusing lens 101); 102 an iris to control an incident light amount; 103 an image pickup device such as a CCD for photoelectrically converting an object image formed on the image pickup surface by the focusing lens 101, thereby converting into an image pickup signal; 104 a preamplifier to amplify the image pickup signal generated from the image pickup device into the signal of a predetermined level; and 105 a process circuit for executing predetermined signal processes such as gamma correction, blanking process, addition of a sync signal, and the like to a video signal generated from the preamplifier 104, for converting into a standardized standard television signal, and for outputting from a video output terminal. A television signal generated from the process circuit 105 is supplied as a video output to a video recorder (not shown) or an electronic view finder (not shown).

Reference numeral 113 denotes a full band pass filter which has been set so that the magnitude of the contrast of the object can be discriminated from the video signal which is supplied from the preamplifier 104; 114 a band pass filter to extract high frequency components necessary to detect an in-focus state from the video signal generated from the preamplifier 104; and 115 a blur width (width of the edge portion of the object) detection circuit to detect a blur width of the object image from the video signal by using a nature such that the blur width of the object decreases as a focusing state approaches the in-focus state. Since an in-focus detecting method by the blur width detection circuit has been known in, for example, JP-A-62-103616 or the like, its detailed description is omitted here.

Reference numeral 116 denotes a gate circuit for gating outputs of the object discrimination filter 113, band pass filter 114, and blur width detection circuit 115 and for allowing only the signal corresponding to the portion in the designated area on the image pickup surface to pass. The gate circuit 116 allows only the signal corresponding to the designated area in the video signal of one field to pass in accordance with a gate pulse which is supplied from a camera microcomputer 118, which will be explained hereinlater. Thus, a pass area to extract the high frequency component, namely, an in-focus detecting area to perform the in-focus detection can be set at an arbitrary position in the image pickup surface.

Reference numeral 117 denotes a peak position detection circuit to detect positions in the horizontal and vertical directions in the image pickup picture plane in which the peak value of the high frequency component was obtained from the video signal corresponding to the in-focus detecting area extracted by the gate circuit 116. The peak position detection circuit detects that the peak position detected in one field period of time is located in which one of the blocks in the case where the in-focus detecting area was divided into predetermined number of blocks in the horizontal and vertical directions and generates the horizontal and vertical coordinates.

The camera microcomputer 118 performs the in-focus detection to the object and executes the focusing control on the basis of the video signal corresponding to the inside of the set in-focus detecting area. That is, the camera microcomputer 118 receives the blur width information supplied from the blur width detection circuit 115 and the peak value information of the high frequency component supplied form the band pass filter 114. The camera microcomputer 118 subsequently transmits focusing control commands regarding the rotating direction, rotational speed, rotation/stop, and the like of the focusing motor to an adapter microcomputer 119 through the mount section MT$_1$ so as to drive the focusing lens 101 to a position such that the blur width in one field period becomes minimum and the peak value of the high frequency component becomes maximum.

In this instance, the camera microcomputer 118 calculates a depth of field from the iris value of the lens and the focal distance information which are obtained from the adapter microcomuter 119 and generates a focusing control command.

The adapter microcomputer 119 sends the focusing control command from the camera microcomputer 118 to a lens microcomputer 120 and converts the data so that the control can be performed and supplies to the lens microcomputer 120 through the mount section MT$_2$. In this instnace, the focusing control command which was corrected as necessary on the basis of the lens information from the lens microcomputer 120 is supplied.

The lens microcomputer 120 converts the focusing control command from the adapter microcomputer 119 into the analog signal by a D/A converter 123 and supplies the analog signal to an AF driver circuit 124, so that the focusing lens 101 is controlled through an actuator 125 for focusing. The result of the driving is detected by a sensor 126. A detection output of the sensor 126 is transmitted through a sensor amplifier 127 and is converted into a digital signal by an A/D converter 128. The digital signal is supplied to the lens microcomputer 120. Such status information is supplied from the lens microcomputer 120 to the camera microcomputer 118 through the adapter microcomputer 119.

The AF control signal from the video camera side is normalized in a form such as "change speed of a blur circle diameter on the image pickup surface when the iris is released" and "driving direction" with respect to, for example, a DC motor as an example, and such a normalized signal is sent.

On the other hand, the AF control signal of the lens for the silver-salt film camera is needed to be sent in a form such as "the number of drive pulses of the pulse motor in the lens" and "driving direction". Therefore, in the conversion adapter, the data is converted on the basis of the relation between the above two information.

It is now assumed that, for example, a focusing lens feed amount (FLK) per one pulse of the focusing pulse motor and a coefficient (DFC) of the focusing lens feed amount and defocusing are sent from the lens side as data that is peculiar to the lens. It is also assumed that an opening F-No (F) that is peculiar to the lens is also sent.

The AF control information from the video camera, in other words, can be said as "speed" and "direction". A pulse motor is generally used as driving means built in the lens for a still camera because of a high response speed. In the pulse motor, however, a form of "speed" cannot accurately be obtained. This is because although the pulse motor has a meaning for the driving of one pulse, a time which is necessary for the driving of one pulse is not obtained from the lens for a still camera.

That is, a specification that is required for the still camera is a high response speed and its speed is changed in dependence on the performance of the lens. Therefore, to consider the speed control in the still camera, the form of "speed" must be formed by a false method.

In the embodiment, such a false method is accomplished by using a method of what is called a duty driving such that a predetermined number of drive pulses "x" is provided and such drive pulses are generated for an interval "T" and the lens driving motor is driven.

In this case, a defocusing amount D per one pulse of the pulse motor is expressed by the following equation (1).

$$D = DFC \times FLK \tag{1}$$

As mentioned above, FLK denotes a focusing lens feed amount per one pulse of the focusing pulse motor and DFC indicates a coefficient of the focusing lens feed amount and defocusing.

Now, assuming that $D_m$ denotes the maximum defocusing amount and P indicates the number of pulses such as to set the defocusing amount to 0 when the pulse motor is driven by P pulses, there is the following relation of the equation (2).

$$D_m/D = P \tag{2}$$

By using $D_m$, the maximum blur circle diameter $\delta_m$ in the iris opening state can be obtained by the following equation (3).

$$\delta_m = D_m/F \tag{3}$$

F denotes a release F-No of the lens.

A time $T_t$ which is necessary in case of setting the blur circle diameter to 0 at a certain speed $V_n$ (mm/sec) is obtained by the following equation (4).

$$T_t = \delta_m/V_n \text{ (sec)} \tag{4}$$

A suffix "n" in the equation (4) denotes the kind of driving speed from the camera. For example, when assuming that n=0 to 15, n means that there are sixteen kinds of driving speeds.

The number R of driving times is obtained by the following equation (5) when T assumes a driving period per one driving time.

$$R = T_t/T \tag{5}$$

The number x of pulses per unit driving when the maximum blur circle diameter assumes 0 is obtained by the following equation (6).

$$x = P/R \tag{6}$$

By substituting the equations (1) to (5) into the equation (6) and modifying the equation (6), the following equation (7) is obtained.

$$x = (T \times F \times V_n)/(DFC \times FLK) \tag{7}$$

By modifying the equation (7), the speed $V_n$ is expressed by the following equation (8).

$$V_n = (x \times DFC \times FLK)/(T \times F) \tag{8}$$

The equation (8) shows the relation between the normalized speed information which is given from the video camera and the driving information which is given to the lens. When the number of drive pulses is set to a fixed value in the equation (8), in order to falsely accomplish the speed given from the camera, it is sufficient to give a drive command such that the lens is driven at a period T that is expressed by the following equation (9) to the lens.

$$T = (x \times DFC \times FLK)/(V_n \times F) \tag{9}$$

According to the embodiment, there is used a method whereby information is divided into information which changes in accordance with the state of the lens and information which is not changed in the equation (9), arithmetic operations of the portion which are not changed in accordance with the state of the lens are executed at the early time, the results of the arithmetic operations are stored as a table in the adapter microcomputer, and the arithmetic operations are again executed in the case where the data which is changed in accordance with such data and the state of the lens changes. By using the above method, the arithmetic operations are simplified and a high operating speed is accomplished.

In the equation (9), F and FLK denote the former information and DFC denotes the latter information. x indicates the number of drive pulses per one time and can be considered as a constant. On the other hand, since $V_n$ indicates the speed which is determined by a format, when it is now assumed that there are speeds of, for example, sixteen stages of $V_0$ to $V_{15}$, each of the speeds can be handled as a constant.

Therefore, a constant C as shown by the following equation (10) is previously calculated and stored in the microcomputer. Each time the DFC changes, the arithmetic operation as shown by the following equation (11) is executed with respect to each speed $V_n$. The results of the arithmetic operations are stored as a speed table in the microcomputer. When a drive command is given from the camera, a lens drive command based on a predetermined number of pulses is supplied to the lens every driving period obtained with reference to the data in the speed table.

$$C = (x \times FLK)/F \tag{10}$$

$$T = C \times DFC/V_n \tag{11}$$

In the present invention, the above arithmetic operations to convert the driving signal for the video camera from the camera side into the driving signal of the lens for the still camera are executed by the conversion adapter as mentioned above.

However, even when the exchangeable lens for the still camera system can be freely attached by using the conversion adapter, there are various kinds of still camera lenses such as wide angle lens, standard lens, telephoto lens, macro lens, and soft focusing lens. Among those lenses, there are also two kinds of zoom lenses such as zoom lens of a single focal distance and zoom lens whose focal distance is variable. When those lenses are AF controlled, in the case where the focusing lens is actually operated at each speed obtained by the calculations, there is a danger of the occurrence of an erroneous operation such that the realizing speed differs from the desired speed in dependence on the lens, it takes a time to obtain an in-focus state, or the lens doesn't reach the in-focus state.

Figure 10:
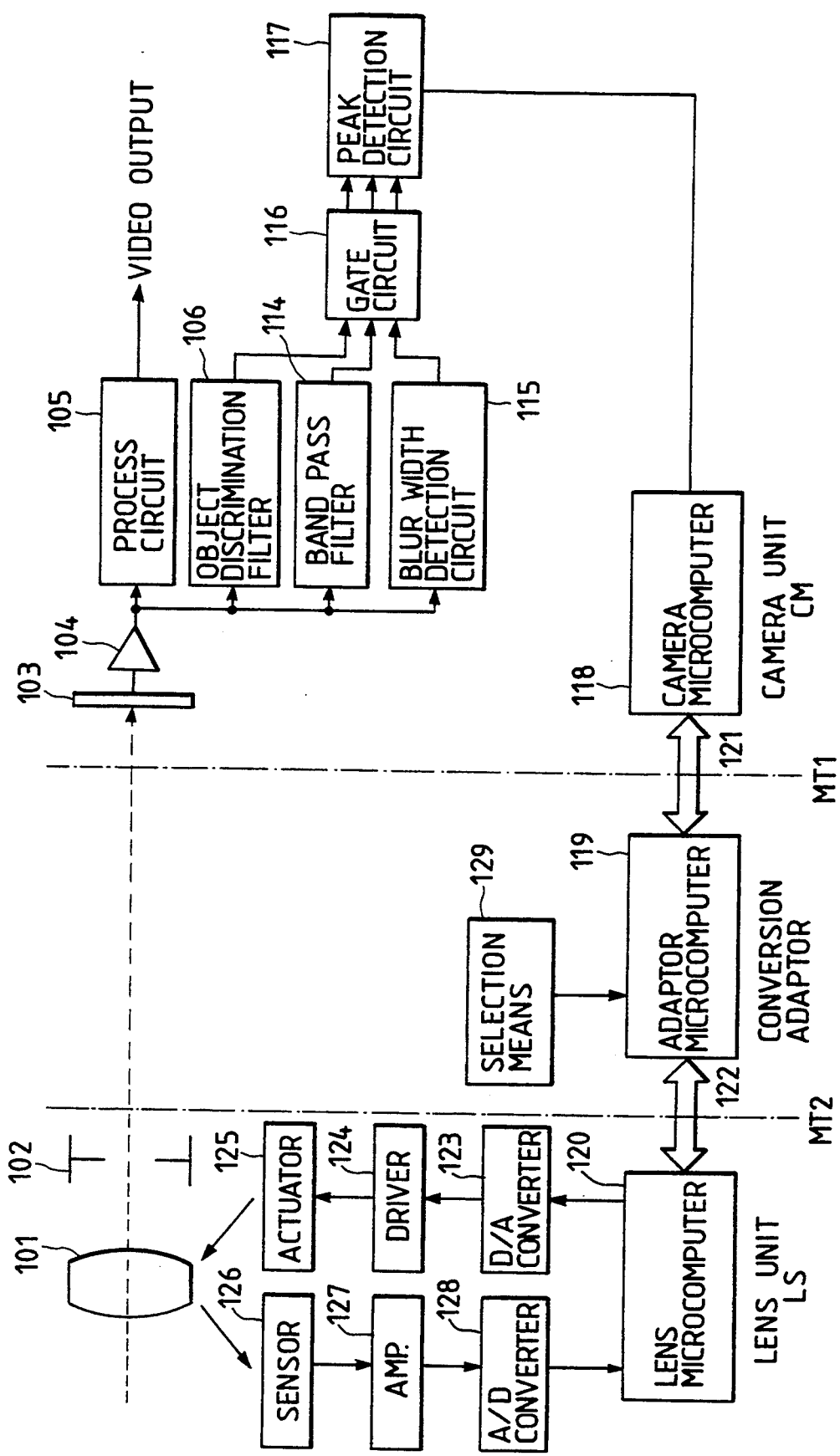
FIG. 10 is a block diagram of an exchangeable lens system using a conversion adapter showing the fifth embodiment of the invention.

Therefore, by providing signal converting means for converting the AF control signal which is transferred from the video camera to the conversion adapter into the AF control signal such that the exchangeable lens group for a still camera can be controlled (driven) and selecting means for selecting the minimum number of drive pulses according to the opening F value which is obtained by calculating from the data that is peculiar to the lens for the signal converting means, the desired focusing speed control can be realized. A high precision speed control can be performed for each exchangeable lens. A variation of the performance of the AF control by the lens is suppressed. The good AF control can be executed. FIG. 10 shows a construction of an embodiment of an exchangeable lens system of the present invention having such selecting means.

FIG. 10 is a diagram showing a construction in the case where a lens unit for a still camera is connected to a video camera by using a conversion adapter. In FIG. 10, the same component elements as those shown in FIG. 9 are designated by the same reference numerals and their descriptions are omitted.

In the diagram, the mount sections $MT_1$ and $MT_2$ shown by alternate long and short dash lines in a central portion are set to boundaries. The right side of the boundaries relates to the camera unit CM, the center relates to the conversion adapter AD, and the left side relates to the lens unit LS. The camera unit CM, conversion adapter AD, and lens unit LS have the microcomputers 118, 119, and 120, respectively. Such a construction is similar to that mentioned above.

The adapter microcomputer 119 receives the focusing control command generated from the camera microcomputer 118 through the mount section $MT_1$ and converts into the data which can control the lens unit and, after that, transmits to the lens microcomputer 120 through the mount section $MT_2$. When such a data conversion is executed, the corresponding minimum number of drive pulses is selected by selecting means 129 on the basis of the lens information from the lens microcomputer 120. The focusing control command is supplied to the lens microcomputer 120.

The lens microcomputer 120 converts the focusing control command from the adapter microcomputer 119 into the analog signal by the D/A converter 123 and supplies the analog signal to the AF driver circuit 124, thereby controlling the focusing lens 101 through the focusing actuator 125. The result of the driving is detected by the iris sensor 126. A detection output of the sensor 126 is transmitted through the sensor amplifier 127 and is converted into a digital signal by the A/D converter 128. The digital signal is supplied to the lens microcomputer 120.

The control operation of the adapter microcomputer in the invention will now be described with reference to a flowchart shown in FIG. 11.

When the control is started, various data of the lens unit is first read out by the communication with the lens unit in step 401. In step 402, the predetermined minimum number of drive pulses is selected by the selecting means 129 in correspondence to the release F value from the data that is peculiar to the lens unit attached.

In step 403, an arithmetic operation is executed while setting the minimum number of drive pulses selected in step 402 to a predetermined fundamental number of pulses, and the focusing speed to drive the lens corresponding to the focusing control command (speed commands $V_0$–$V_{15}$) which is generated from the camera microcomputer 118 in order to control the focusing lens is obtained by arithmetic operations or is obtained from the conversion table on the basis of the lens information (specific arithmetic operations are as shown in the foregoing equations). In step 404, the driving period T is obtained by the equations (10) and (11).

In step 405, the apparatus communicates with the camera. In step 406, the data for AF control is extracted. In step 407, a check is made to see if the AF control command given in step 406 is a drive command to actually drive the motor or not. If NO in step 406, the processing routine is returned to step 405 and the data is communicated. If YES, the processes in step 408 and subsequent steps are executed.

In step 408, the predetermined drive pulses are generated in a form of the focusing motor drive command. Practically speaking, the code corresponding to the focusing motor drive command and the number of drive pulses are parallel-to-serial converted and the converted data is sent to the lens in a form of the serial communication.

Further, a timer to form the driving period of started in step 409 on the basis of the driving period corresponding to the speed information of the drive command among the driving periods obtained in step 404 or subsequent step 416.

In step 410, a check is made to see if the operation of the above timer has been finished (next drive pulse generation timing) or not. If NO, the processing routine is returned to step 408 and the drive pulses are again generated to the lens unit. If NO in step 410, the commands which are sent from the camera are fetched in steps 411 and 412. A check is made in step 413 to see if the drive command has been changed or not.

If YES in step 413, the processing routine is returned to step 407 and the focusing drive command is extracted. In steps 408 and 409, the driving period is changed and the drive command is again supplied to the lens unit.

When it is determined in step 413 that the drive command is not changed, step 414 follows and the value of DFC is obtained by communicating with the lens unit. The DFC value is compared with the value in the pair obtained so far in step 415. When there is no change, the processing routine is returned to step 410 and the completion of the operation of the timer is discriminated. When the DFC value has been changed, the driving period for every speeds is again calculated in accordance with the equations (10) and (11) in step 416 and the processing routine is returned to step 410 and the completion of the present driving period is judged. After that step 408 follows and the drive command is supplied to the lens at the newly calculated driving period.

Figure 11:
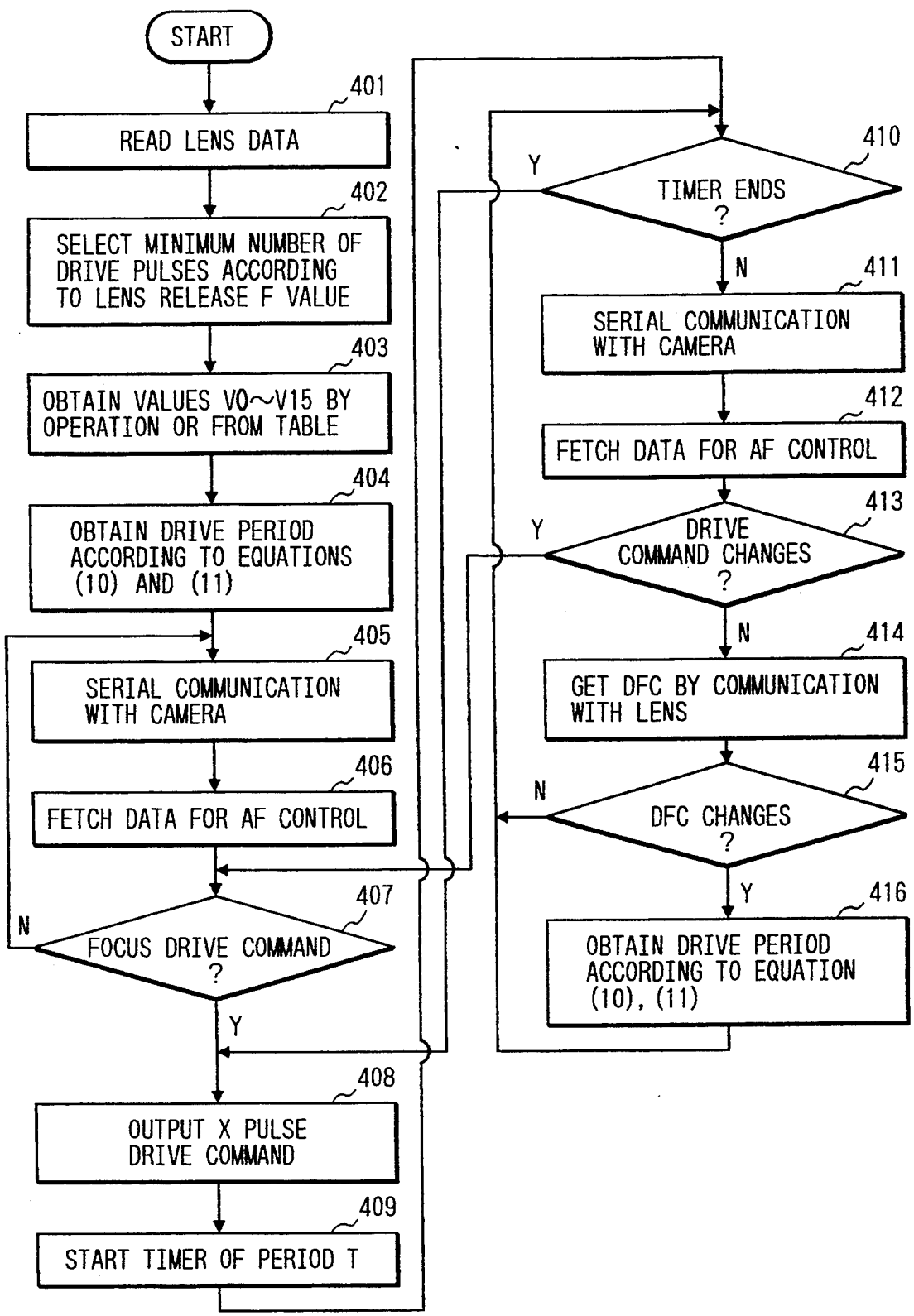
FIG. 11 is a flowchart for explaining the operation in the fifth embodiment of the invention.
Figure 12:
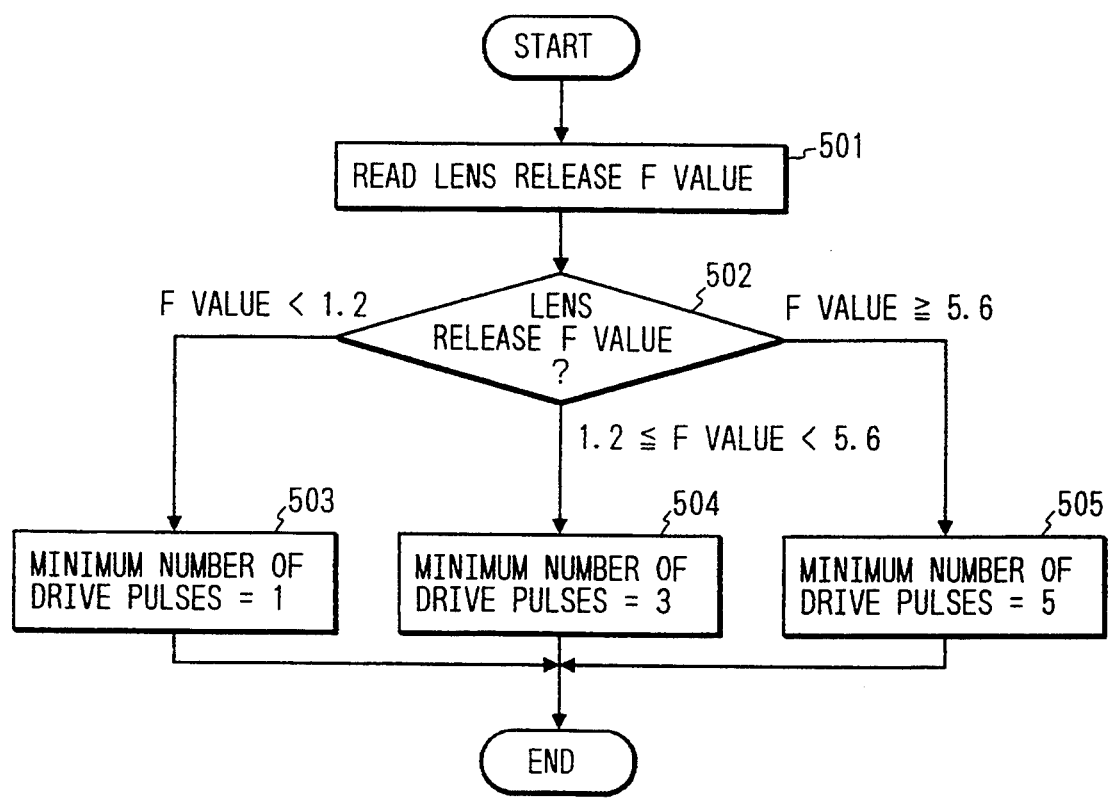
FIG. 12 is a flowchart for explaining the operation in the fifth embodiment of the invention.

FIG. 12 is a flowchart showing a specific example of the selecting process of the control method (correcting method) which is executed in step 402 in the flowchart of FIG. 11.

In the diagram, the opening F value in the lens unit is read in step 501. In step 502, the release F value is judged. When the opening F value is less than 1.2, step 503 follows and "one pulse" is selected as the minimum number of drive pulses. When the release F value lies within a range of (1.2≦opening F value<5.6), step 504 follows and "three pulses" are selected as the minumum number of drive pulses. When the release F value is equal to or larger than 5.6, step 505 follows and "five pulses" are selected as the minimum number of drive pulses.

For example, when the minimum number of drive pulses is equal to 3, a drive amount for one command is too large, the focusing lens is not stopped at the in-focus point, so that a hunting is repeated or it takes a time to obtain an in-focus state. However, in the case where the focusing movement amount in one drive command for the blur amount is proper in case of one pulse, by previously setting so as to select "one pulse" as the minimum number of drive pulses corresponding to the release F value of the lens unit, the focusing lens can quickly certainly reach the in-focus point.

According to the embodiment, by selecting the minimum number of drive pulses in correspondence to the release F value as optical characteristics which are peculiar to each lens, the AF control can be efficiently executed to various kinds of lens groups.

Consequently, the lens unit for a still camera or the like which is not inherently adapted to the format for a video camera can be connected. Moreover, a proper correction can be performed even for a difference of the characteristics of the lenses, a variation of them, or the like. Such a still camera lens can be controlled like a special lens.

In the embodiment, the motor to drive the component elements in the lens has been built in the lens. However, they can be also built in the camera main body. In such a case, a transfer member to transfer the driving force of the motor to the lens is necessary.

According to the invention as mentioned above, as shown in the first to fourth embodiments, it is possible to realize a control system of a conversion adapter such that by using the data discriminating means, even when any lens is attached, an erroneous operation due to the abnormality of the storage data can be prevented and the good AF control and AE control can be performed from the beginning.

According to the invention, as shown in the fifth embodiment, in the exchangeable lens system, the focusing control speed is selected on the basis of the peculiar data such as a release F value or the like of the lens unit attached, and the focusing control command from the camera side is converted into the proper control information. Therefore, the control speed can be adjusted for each of a plurality of lens units of different optical characteristics. Even in the case where the exchangeable lens groups for a still camera system are connected to the camera for an exchangeable lens system of a video movie camera or the like, the uniform good AF control can be efficiently performed.

What is claimed is:

1. A control apparatus in a system which has a control apparatus and an apparatus to be controlled that can be freely attached or detached to/from said control apparatus and in which the apparatus to be controlled is controlled on the basis of drive data that is peculiar to the apparatus to be controlled, wherein said control apparatus comprises:
   rewritable first memory means for storing said peculiar drive data;
   means for comparing the peculiar drive data read out frown said apparatus to be controlled with a registered drive data stored in a second memory means in the control apparatus; and
   discriminating means for discriminating whether the peculiar drive data read out from said apparatus to be controlled corresponds to the drive data stored in the second memory means and for prohibiting a rewriting operation of the first memory means when it is determined that the peculiar drive data does not correspond to the drive data registered in the second memory.

2. An apparatus according to claim 1, further having control means for controlling the apparatus to be controlled on the basis of the drive data stored in said memory means.

3. An apparatus according to claim 2, wherein said control means is provided in said control apparatus.

4. An apparatus according to claim 1, wherein said control apparatus is provided in the camera main body.

5. An apparatus according to claim 4, wherein said apparatus to be controlled is a lens unit.

6. An apparatus according to claim 1, wherein said apparatus to be controlled can be attached or detached to/from the control apparatus through an adapter.

7. An apparatus according to claim 6, wherein said memory means is provided in said adapter.

8. A camera system comprising:
   (a) a camera main body;
   (b) a lens unit which can be attached or detached to/from said camera main body and which has a first memory to store peculiar drive data regarding a lens;
   (c) a second memory in said camera main body for reading the drive data in said first memory and for storing;
   (d) discriminating means for comparing the drive data read out from the first memory and predetermined reference drive data in said camera main body and for judging whether the drive data read out from the first memory corresponds to the reference drive data; and
   (e) inhibiting means for inhibiting the writing operation of the drive data from the first memory into the second memory on the basis of the result of the discrimination by said discriminating means.

9. A camera system according to claim 8, further having control means for controlling the lens unit on the basis of the drive data in the second memory.

10. A camera system according to claim 8, wherein said second memory is provided in the camera main body.

11. A camera system according to claim 8, wherein said discriminating means is provided in the camera main body.

12. A camera system according to claim 8, wherein said inhibiting means is provided in the camera main body.

13. A camera main body according to claim 8, further including an adapter unit to attach the lens unit to the camera main body.

14. A camera system according to claim 8, wherein said lens unit includes an adapter unit to attach the lens unit to the camera main body.

15. A control apparatus for a detachable apparatus, comprising:
   (a) registering means for registering drive characteristic data of a plurality of different types of detachable apparatus;
   (b) detecting means for reading out a drive characteristic data from said detachable apparatus and for forming an abnormal indication when detecting that the drive characteristic data read out from said detachable apparatus do not correspond to a registered drive characteristic data; and
   (c) memory means in said control apparatus for storing said drive characteristic data read out from said detachable apparatus if said detecting means does not form said abnormal indication.

16. A control apparatus according to claim 15, wherein said registering means includes a memory.

17. A control apparatus according to claim 15, wherein said control apparatus includes a camera body.

18. A control apparatus according to claim 15, wherein said detachable apparatus includes a lens apparatus.

19. A control apparatus according to claim 15, wherein said drive characteristic data includes an aperture drive data.

* * * * *

UNITED STATES PATENT AND TRADEMARK OFFICE
CERTIFICATE OF CORRECTION

PATENT NO. : 5,434,637
DATED : July 18, 1995
INVENTOR(S) : Seiya Ohta

It is certified that error appears in the above-indentified patent and that said Letters Patent is hereby corrected as shown below:

On the title page, item [75], delete "Yokohama" and insert --Kanagawa-ken--.

In Column 3, line 13, "whcih" should read --which--.

In Column 3, line 14, "vairous" should read --various--.

In Column 4, line 34, "a" should read --an--.

In Column 4, line 54, "proivded" should read --provided--.

In Column 4, line 64, delete "further".

In Column 5, line 34, "diagrm" should read --diagram--.

In Column 6, lines 42-43, "up-datig" should read --updating--.

In Column 6, line 66, "an" should read --a--.

In Column 7, line 1, "an" should read --a--.

In Column 7, line 5, "vlaue" should read --value--.

In Column 7, line 20, "Embodiemnt" should read --Embodiment--.

In Column 10, line 2, "microcomuter" should read --microcomputer--.

In Column 10, line 9, "instnace" should read --instance--.

In Column 8, line 43, insert a space between "MT." and "shown".

In Column 15, Claim 1, line 48, "frown" should read --from--.

Signed and Sealed this

Twenty-first Day of November, 1995

BRUCE LEHMAN

Attest:

Attesting Officer

Commissioner of Patents and Trademarks